United States Patent
Beggs et al.

(10) Patent No.: US 11,161,224 B2
(45) Date of Patent: Nov. 2, 2021

(54) CHAIN SPROCKET TENSIONER WRENCH APPARATUS

(71) Applicants: Donald Beggs, Los Lunas, NM (US); Robert Valenzuela, Los Lunas, NM (US)

(72) Inventors: Donald Beggs, Los Lunas, NM (US); Robert Valenzuela, Los Lunas, NM (US)

( * ) Notice: Subject to any disclaimer, the term of this patent is extended or adjusted under 35 U.S.C. 154(b) by 246 days.

(21) Appl. No.: 16/400,463

(22) Filed: May 1, 2019

(65) Prior Publication Data
US 2020/0346327 A1 Nov. 5, 2020

(51) Int. Cl.
*B25B 13/48* (2006.01)
*B25B 23/00* (2006.01)
*F16H 7/08* (2006.01)

(52) U.S. Cl.
CPC ........ *B25B 13/481* (2013.01); *B25B 23/0007* (2013.01); *F16H 7/08* (2013.01); *F16H 2007/088* (2013.01)

(58) Field of Classification Search
CPC ....... B25B 13/481; B25B 13/50; B25B 13/52; B25B 27/0035; B25B 27/0042; F16H 7/08; F16H 7/24; F16H 7/023; F16H 7/06; F16H 2007/088; F16H 2007/0855
USPC ........... 254/131; 474/130; 81/57.4, 64, 65.2, 81/177.6
See application file for complete search history.

(56) References Cited

U.S. PATENT DOCUMENTS

| | | | | |
|---|---|---|---|---|
| 1,301,202 A | * | 4/1919 | Walker | B25B 13/52 81/65.2 |
| 2,420,682 A | * | 5/1947 | Powell | B25B 13/46 81/52 |
| 2,566,108 A | * | 8/1951 | Anderson | B25B 13/52 81/69 |
| 2,577,157 A | * | 12/1951 | Ross | B25B 13/52 81/177.6 |
| 2,678,577 A | * | 5/1954 | Tackett | B25B 13/481 81/57.3 |
| 2,825,253 A | * | 3/1958 | Brenner | B25B 13/463 81/68 |
| 3,714,852 A | * | 2/1973 | Giangrasso | B25B 13/481 81/57.3 |
| 4,098,151 A | * | 7/1978 | Bliss | B25B 17/00 81/57.3 |

(Continued)

FOREIGN PATENT DOCUMENTS

GB 937589 A * 9/1963 ............. B25B 13/52

*Primary Examiner* — David B. Thomas
*Assistant Examiner* — Robert F Neibaur

(57) ABSTRACT

A chain sprocket tensioner wrench apparatus for safely and easily loosening engine belt tensioners in tight spaces includes a housing and a frame clip coupled to a bottom edge of the housing configured to selectively engage a frame of a truck. A sprocket is rotatably coupled within the housing and is configured to selectively receive a socket wrench to be driven. A chain stop is coupled to a back edge of the housing. A chain has a proximal end pivotably coupled to the chain stop, extends over the sprocket, and extends down beneath the frame clip. A wrench is pivotably coupled to a distal end of the chain and is configured to selectively engage a belt tensioner of an engine of the truck. Driving the sprocket drive head lifts the chain to pivot the wrench and rotate the wrench drive head to loosen the belt tensioner.

12 Claims, 4 Drawing Sheets

(56) References Cited

U.S. PATENT DOCUMENTS

| | | |
|---|---|---|
| 4,380,326 A | 4/1983 | Marzorati |
| D289,134 S | 4/1987 | Hodges |
| 4,656,894 A * | 4/1987 | Goetz .................... B25B 13/00 |
| | | 81/57.43 |
| 5,320,021 A * | 6/1994 | Heintz .................... B25B 13/52 |
| | | 81/177.2 |
| 5,653,654 A | 8/1997 | Davis |
| 6,161,817 A | 12/2000 | Lee |
| 7,056,244 B2 | 6/2006 | Hodjat |
| 8,403,784 B2 | 3/2013 | Conneely |
| 8,689,661 B2 * | 4/2014 | Maltby .................... F16H 51/02 |
| | | 74/522 |
| 9,440,338 B2 * | 9/2016 | Crawford ................ B25B 17/00 |
| 2004/0138019 A1 * | 7/2004 | Liu .................... B25B 27/0071 |
| | | 474/156 |
| 2006/0021481 A1 | 2/2006 | Sluzalis |

* cited by examiner

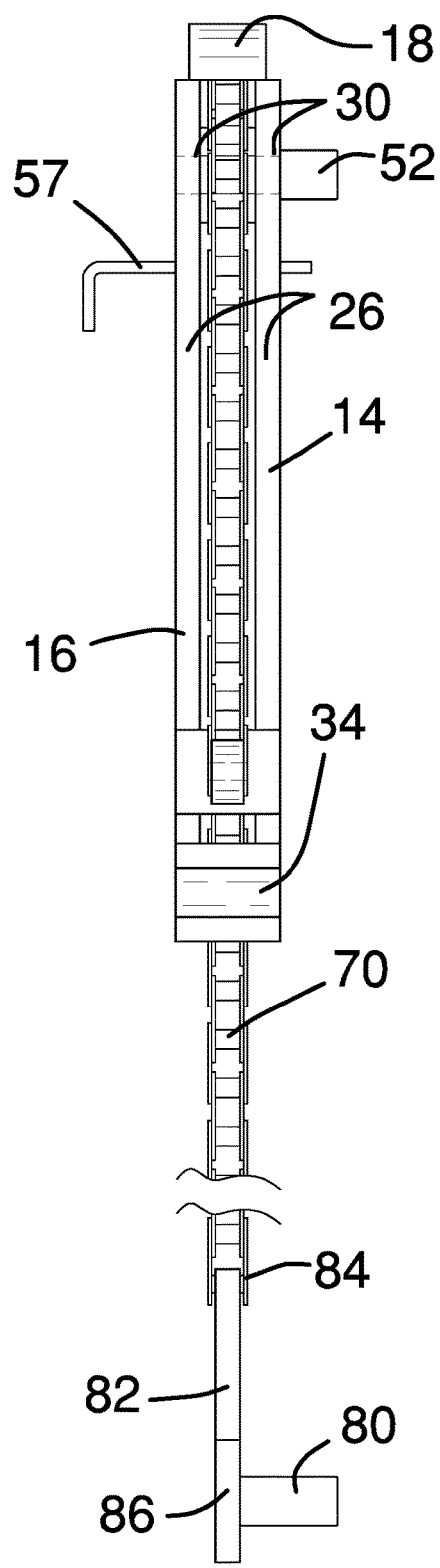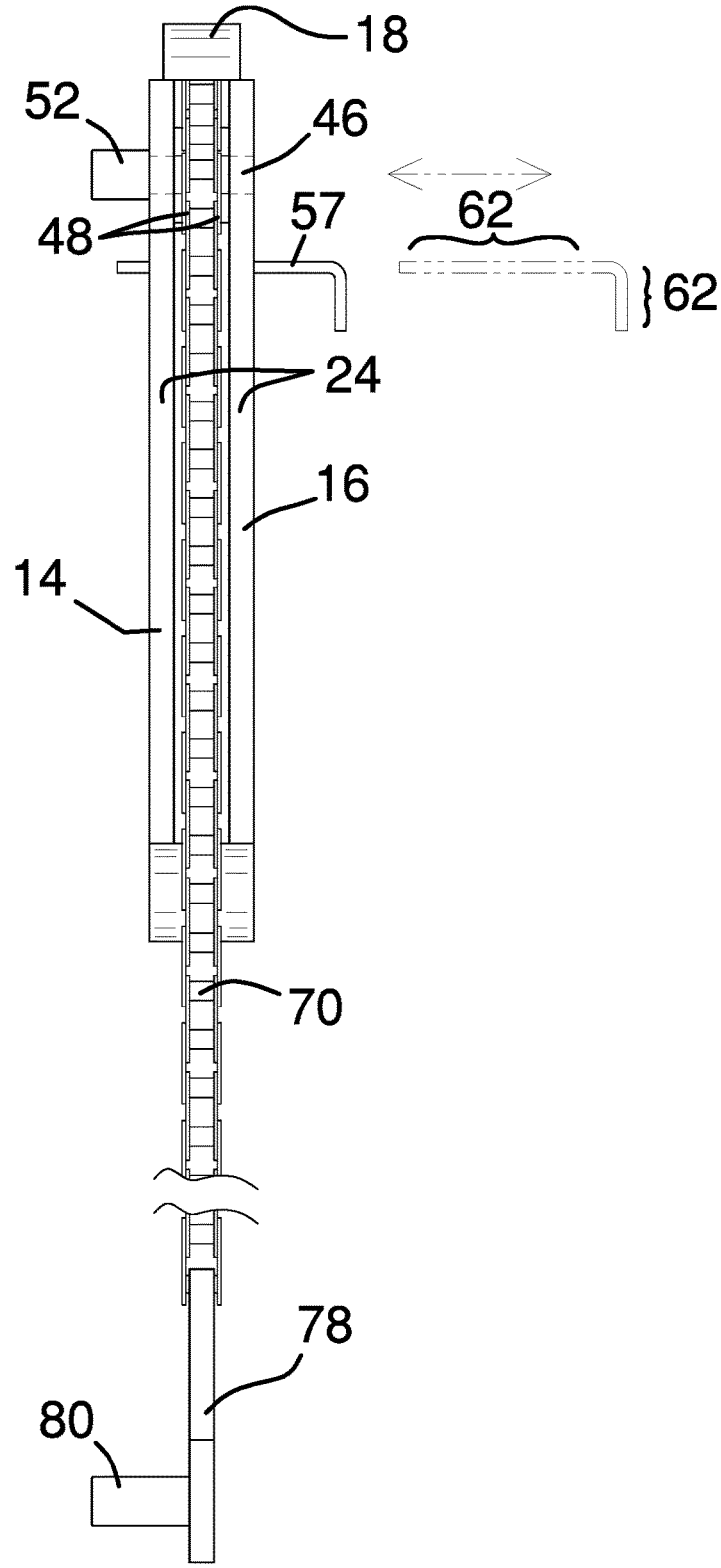
FIG. 3
FIG. 4

CHAIN SPROCKET TENSIONER WRENCH APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wrenches and more particularly pertains to a new wrench for safely and easily loosening engine belt tensioners in tight spaces.

BRIEF SUMMARY OF THE INVENTION

An embodiment of the disclosure meets the needs presented above by generally comprising a housing having a right plate separated from a left plate and a top brace coupled to a top edge of each of the right plate and the left plate. Each of the right plate and the left plate have an axle aperture extending therethrough proximal the top edge. A frame clip is coupled to a bottom edge of each of the right plate and the left plate and is configured to selectively engage a frame inside an engine compartment of a truck. A sprocket is coupled to the housing. The sprocket has an axle extending between the axle aperture of the right plate and the left plate, a bearing coupled to the axle and the housing, a wheel coupled to the bearing, the wheel having a plurality of teeth, and a sprocket drive head coupled to the axle outside an outer face of the right plate. The sprocket drive head rotates the wheel and is configured to selectively receive a socket wrench. A chain stop is coupled to a back edge of each of the right plate and the left plate proximal the bottom edge. A chain has a proximal end pivotably coupled to the chain stop, extends over the sprocket beneath the top brace engaging the plurality of teeth of the wheel, and extends down beneath the frame clip. A wrench has a wrench body pivotably coupled to a distal end of the chain and a wrench drive head perpendicularly coupled to the wrench body. The wrench drive head is configured to selectively engage a belt tensioner of an engine of the truck. Driving the sprocket drive head lifts the chain to pivot the wrench and rotate the wrench drive head.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a left side elevation view of an embodiment of the disclosure.

FIG. 4 is a right side elevation view of an embodiment of the disclosure.

DETAILED DESCRIPTION OF THE INVENTION

Figure 1:
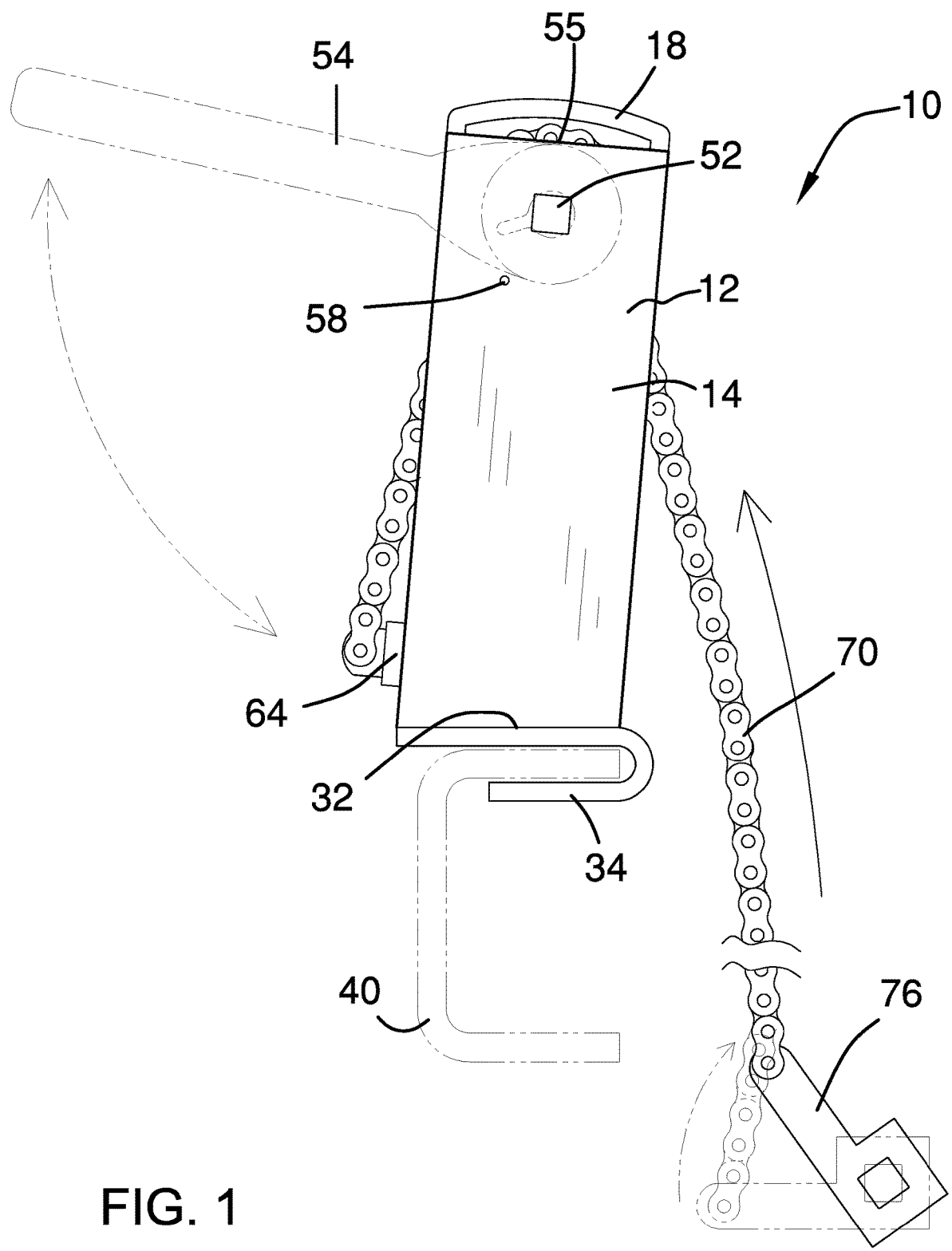
FIG. 1 is a front elevation in-use view of a chain sprocket tensioner wrench apparatus according to an embodiment of the disclosure.
Figure 2:
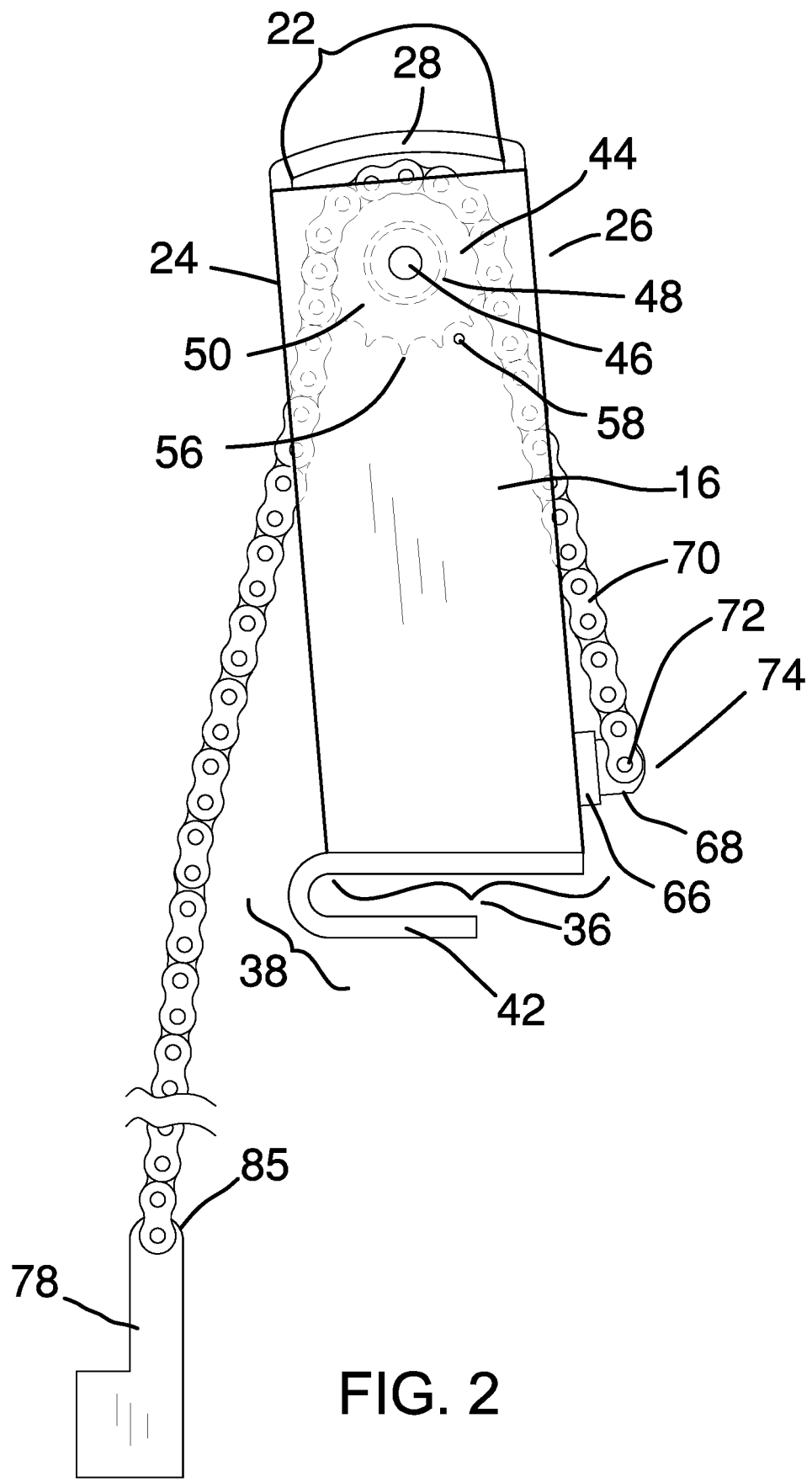
FIG. 2 is a rear elevation view of an embodiment of the disclosure.
Figure 5A:
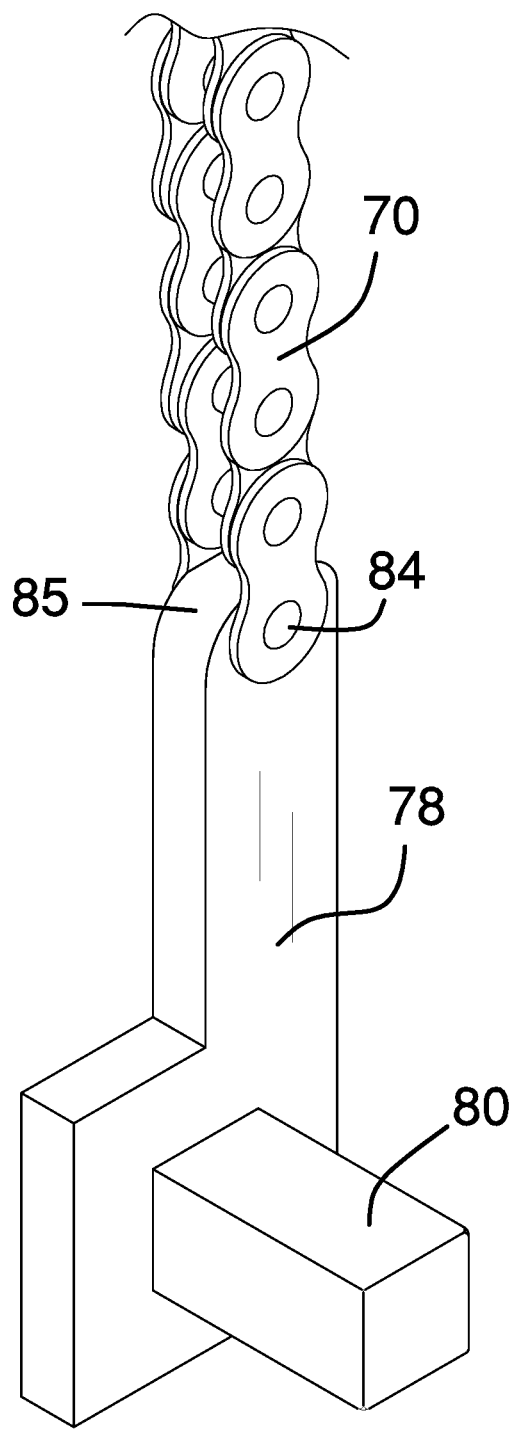
FIG. 5a is a detail isometric view of an embodiment of the disclosure.
Figure 5B:
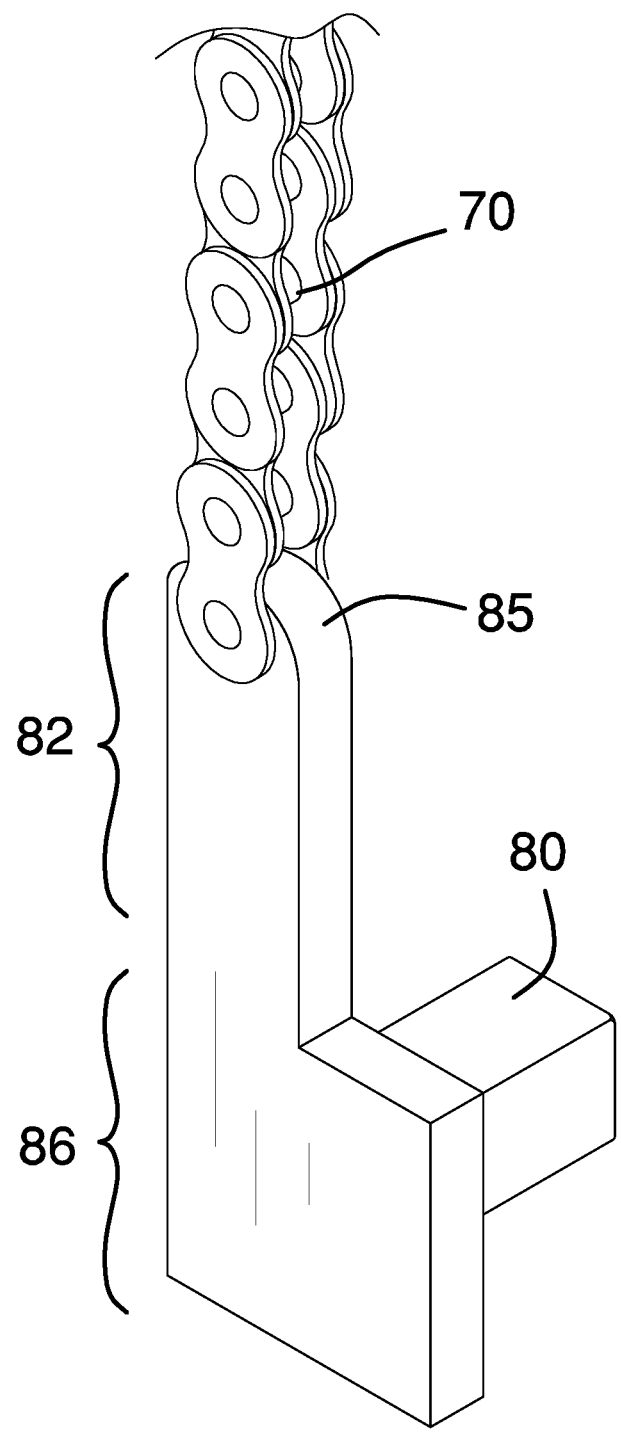
FIG. 5b is a detail isometric view of an embodiment of the disclosure.

With reference now to the drawings, and in particular to FIGS. 1 through 5b thereof, a new wrench embodying the principles and concepts of an embodiment of the disclosure and generally designated by the reference numeral 10 will be described.

As best illustrated in FIGS. 1 through 5b, the chain sprocket tensioner wrench apparatus 10 generally comprises a housing 12 having a right plate 14 separated from a left plate 16 and a top brace 18 coupled to a top edge 20 of each of the right plate 14 and the left plate 16. The top brace 18 has a pair of vertical extensions 22 coupled adjacent a front edge 24 and a back edge 26 of the right plate and the left plate and a curved bridge portion 28 extending between the pair of vertical extensions 22. Each of the right plate 14 and the left plate 16 have an axle aperture 30 extending therethrough proximal the top edge 20. The back edge 26 of the right plate and the left plate form an acute angle with a bottom edge 32 and the back edge 26 and the front edge 24 are parallel.

A frame clip 34 is coupled to the housing 12. The frame clip 34 has a planar base portion 36 coupled to the bottom edge 32 of each of the right plate and the left plate and a curved hook portion 38 extending from the base portion 36. The frame clip 34 is configured to selectively engage a frame 40 inside an engine compartment of a truck such that the base portion 36 rests on the frame 40 and the hook portion 38 wraps around the frame 40. The base portion 36 and the hook portion 38 form a rotated U-shape with a lower extension 42 of the hook portion 38 parallel with the base portion 36. A length of the lower extension 42 is less than a length of the base portion 36 for easy engagement and disengagement with the frame 40.

A sprocket 44 is coupled to the housing 12. The sprocket 44 has an axle 46 extending between the axle aperture 30 of the right plate and the left plate, a bearing 48 coupled to the axle 46 and the housing 12, a wheel 50 coupled to the bearing 48, and a sprocket drive head 52 coupled to the axle 46 outside an outer face 54 of the right plate 14. The wheel 50 has a plurality of teeth 56. The sprocket drive head 52 rotates the wheel and is configured to selectively receive a socket wrench 54. The bridge portion 28 accommodates and covers an exposed portion 55 of the sprocket extending above the top edge 20 of the right plate and the left plate to prevent accidental contact with the sprocket 44.

A lock pin 57 is selectively engageable with a lock aperture 58 extending through the right plate 14 and the left plate 16 along an axis between adjacent teeth of the plurality of teeth 56. The lock pin 57 has a handle portion 60 and a rod portion 62 with the rod portion 62 extending through the lock apertures 58 past the outer face 54 of both the left plate 14 and the right plate 16 when engaged and preventing the wheel 50 from rotating. The handle portion 60 is not slidable into the lock aperture 58 to prevent over insertion, either by being too thick or by being bent relative the rod portion 62. The handle portion 60 may extend perpendicularly to the rod portion 62 like a traditional Allen key.

A chain stop 64 is coupled to the housing 12. The chain stop 64 has a stop plate 66 coupled to the back edge 26 of each of the right plate and the left plate proximal the bottom edge 32 and a tongue 68 perpendicularly extending from the stop plate 66. A chain 70 is coupled to the chain stop 64. The chain 70 is a roller chain having a proximal end 72 pivotably coupled to the tongue 68 of the chain stop. The chain 70 extends over the sprocket 44 beneath the top brace 18 engaging the plurality of teeth 56 of the wheel and extends down beneath the frame clip 34. An outer end 74 of the tongue is rounded so as to not interfere with the chain 70 when pivoting to allow for slack to develop between the chain stop 64 and the sprocket 44. The forward leaning orientation of the housing 12 aids in preventing the chain 70 from contacting the frame clip 34, which extends past the front edge 24 at the bottom edge 32 but not at the top edge 20.

A wrench 76 has a wrench body 78 and a wrench drive head 80. The wrench body 78 comprises an arm portion 82 pivotably coupled to a distal end 84 of the chain and a shoulder portion 86 coupled to the arm portion 82. An upper end 85 of the arm portion 82 is rounded so as to not interfere with the chain 70 to maximize pivotability. The arm portion 82 is narrower than the shoulder portion 86 so as to minimize size and may be off-center of the shoulder portion 86 with the wrench drive head 80 perpendicularly and centrally coupled the shoulder portion 86 to increase the torque produced. The shoulder portion 86 may be square. The wrench drive head 80 is configured to selectively engage a belt tensioner of an engine of the truck. The sprocket drive head 52 and the wrench drive head 80 may be square drive heads.

In use, the frame clip 34 is engaged with the frame 40 of the truck and the wrench drive head 80 is engaged with the belt tensioner. The socket wrench 54 is attached to the sprocket drive head 52 and is rotated to drive the sprocket drive head 52 and thus the wheel 50 to lift the distal end 84 of the chain, pivoting the wrench 76 and rotating the wrench drive head 80 to loosen the belt tensioner. The socket wrench 54 used may be a ratchet wrench, in which case the lock pin 57 is inserted during each ratchet motion of the socket wrench 54 to prevent the wheel 50 from spinning and removed during each drive motion of the socket wrench 54. When the belt tensioner is sufficiently loosened, the lock pin 57 is inserted and left in place while the engine belt is being changed. When complete, the lock pin 57 is removed and the motion is reversed to allow the belt tensioner to retighten. The wrench drive head 80 is then disengaged once there is slack in the chain 70 and the frame clip 34 is disengaged to remove the apparatus 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A chain sprocket tensioner wrench apparatus comprising:
   a housing, the housing having a right plate separated from a left plate and a top brace coupled to a top edge of each of the right plate and the left plate, each of the right plate and the left plate having an axle aperture extending therethrough proximal the top edge;
   a frame clip coupled to the housing, the frame clip being coupled to a bottom edge of each of the right plate and the left plate and configured to selectively engage a frame inside an engine compartment of a truck, the frame clip having a planar base portion coupled to the bottom edge of each of the right plate and the left plate and a curved hook portion extending from the base portion, the frame clip being configured to selectively engage the frame such that the base portion rests on the frame and the hook portion wraps around the frame, the base portion and the hook portion forming a rotated U-shape, a lower extension of the hook portion being parallel with the base portion and having a length less than a length of the base portion;
   a sprocket coupled to the housing, the sprocket having an axle extending between the axle aperture of the right plate and the left plate, a bearing coupled to the axle and the housing, a wheel coupled to the bearing, the wheel having a plurality of teeth, and a sprocket drive head coupled to the axle outside an outer face of the right plate, the sprocket drive head rotating the wheel and being configured to selectively receive a socket wrench;

a chain stop coupled to the housing, the chain stop being coupled to a back edge of each of the right plate and the left plate proximal the bottom edge;

a chain coupled to the chain stop, the chain having a proximal end pivotably coupled to the chain stop, extending over the sprocket beneath the top brace engaging the plurality of teeth of the wheel, and extending down beneath the frame clip; and a wrench, the wrench having a wrench body pivotably coupled to a distal end of the chain and a wrench drive head perpendicularly coupled to the wrench body, the wrench drive head being configured to selectively engage a belt tensioner of an engine of the truck;

wherein driving the sprocket drive head lifts the chain to pivot the wrench and rotate the wrench drive head.

2. The chain sprocket tensioner wrench apparatus of claim 1 further comprising a lock pin, the lock pin being selectively engageable with a lock aperture extending through the left plate and the right plate along an axis between adjacent teeth of the plurality of teeth, the lock pin extending past the outer face of both the left plate and the right plate when engaged and preventing the wheel from rotating.

3. The chain sprocket tensioner wrench apparatus of claim 2 further comprising the lock pin having a handle portion and a rod portion, the rod portion extending through the lock apertures and the handle portion not being slidable into the lock aperture to prevent over insertion.

4. The chain sprocket tensioner wrench apparatus of claim 1 further comprising a back edge of the right plate and the left plate forming an acute angle with the bottom edge of the right plate and the left plate, the back edge and a front edge of each of the right plate and the left plate being parallel.

5. The chain sprocket tensioner wrench apparatus of claim 1 further comprising the chain being a roller chain.

6. The chain sprocket tensioner wrench apparatus of claim 1 further comprising the wrench body having an arm portion coupled to the distal end of the chain and a shoulder portion coupled to the arm portion, the wrench drive head being coupled the shoulder portion.

7. The chain sprocket tensioner wrench apparatus of claim 6 further comprising an upper end of the arm portion being rounded so as to not interfere with the chain.

8. The chain sprocket tensioner wrench apparatus of claim 1 further comprising each of the sprocket drive head and the wrench drive head being square drive heads.

9. The chain sprocket tensioner wrench apparatus of claim 1 further comprising the top brace having a pair of vertical extensions coupled adjacent a front edge of each of the right plate and the left plate and the back edge of each of the right plate and the left plate and a curved bridge portion extending between the pair of vertical extensions, the bridge portion accommodating an exposed portion of the sprocket extending above the top edge of the right plate and the left plate.

10. The chain sprocket tensioner wrench apparatus of claim 1 further comprising the chain stop having a stop plate coupled to a back edge of each of the right plate and the left plate proximal the bottom edge and a tongue perpendicularly extending from the stop plate, the proximal end of the chain being pivotably coupled to the tongue.

11. The chain sprocket tensioner wrench apparatus of claim 10 further comprising an outer end of the tongue being rounded so as to not interfere with the chain.

12. A chain sprocket tensioner wrench apparatus comprising: a housing, the housing having a right plate separated from a left plate and a top brace coupled to a top edge of each of the right plate and the left plate, the top brace having a pair of vertical extensions coupled adjacent a front edge and a back edge of the right plate and the left plate and a curved bridge portion extending between the pair of vertical extensions, each of the right plate and the left plate having an axle aperture extending therethrough proximal the top edge, the back edge of the right plate and the left plate forming an acute angle with a bottom edge of each of the right plate and the left plate, the back edge and the front edge being parallel; a frame clip coupled to the housing, the frame clip having a planar base portion coupled to the bottom edge of each of the right plate and the left plate and a curved hook portion extending from the base portion, the frame clip being configured to selectively engage a frame inside an engine compartment of a truck such that the base portion rests on the frame and the hook portion wraps around the frame, the base portion and the hook portion forming a rotated 1-shape, a lower extension of the hook portion being parallel with the base portion and having a length less than a length of the base portion; a sprocket coupled to the housing, the sprocket having an axle extending between the axle aperture of the right plate and the left plate, a bearing coupled to the axle and the housing, a wheel coupled to the bearing, the wheel having a plurality of teeth, and a sprocket drive head coupled to the axle outside an outer face of the right plate, the sprocket drive head rotating the wheel and being configured to selectively receive a socket wrench, the bridge portion accommodating an exposed portion of the sprocket extending above the top edge of the right plate and the left plate; a lock pin, the lock pin being selectively engageable with a lock aperture extending through the left plate and the right plate along an axis between adjacent teeth of the plurality of teeth, the lock pin having a handle portion and a rod portion, the rod portion extending through the lock apertures past the outer face of both the left plate and the right plate when engaged and preventing the wheel from rotating, the handle portion not being slidable into the lock aperture to prevent over insertion; a chain stop coupled to the housing, the chain stop having a stop plate coupled to the back edge of each of the right plate and the left plate proximal the bottom edge and a tongue perpendicularly extending from the stop plate; a chain coupled to the chain stop, the chain being a roller chain having a proximal end coupled to the tongue of the chain stop, extending over the sprocket beneath the top brace engaging the plurality of teeth of the wheel, and extending down beneath the frame clip, an outer end of the tongue being rounded so as to not interfere with the chain; a wrench, the wrench having a wrench body and a wrench drive head, the wrench body comprising an arm portion pivotably coupled to a distal end of the chain and a shoulder portion coupled to the arm portion, an upper end of the arm portion being rounded so as to not interfere with the chain, the wrench drive head being perpendicularly coupled the shoulder portion, the wrench drive head being configured to selectively engage a belt tensioner of an engine of the truck; and wherein driving the sprocket drive head lifts the chain to pivot the wrench and rotate the wrench drive head, each of the sprocket drive head and the wrench drive head being square drive heads.

* * * * *